March 8, 1960  R. A. FERRARA  2,927,818
VEHICLE SEAT
Filed Sept. 22, 1958  3 Sheets-Sheet 1
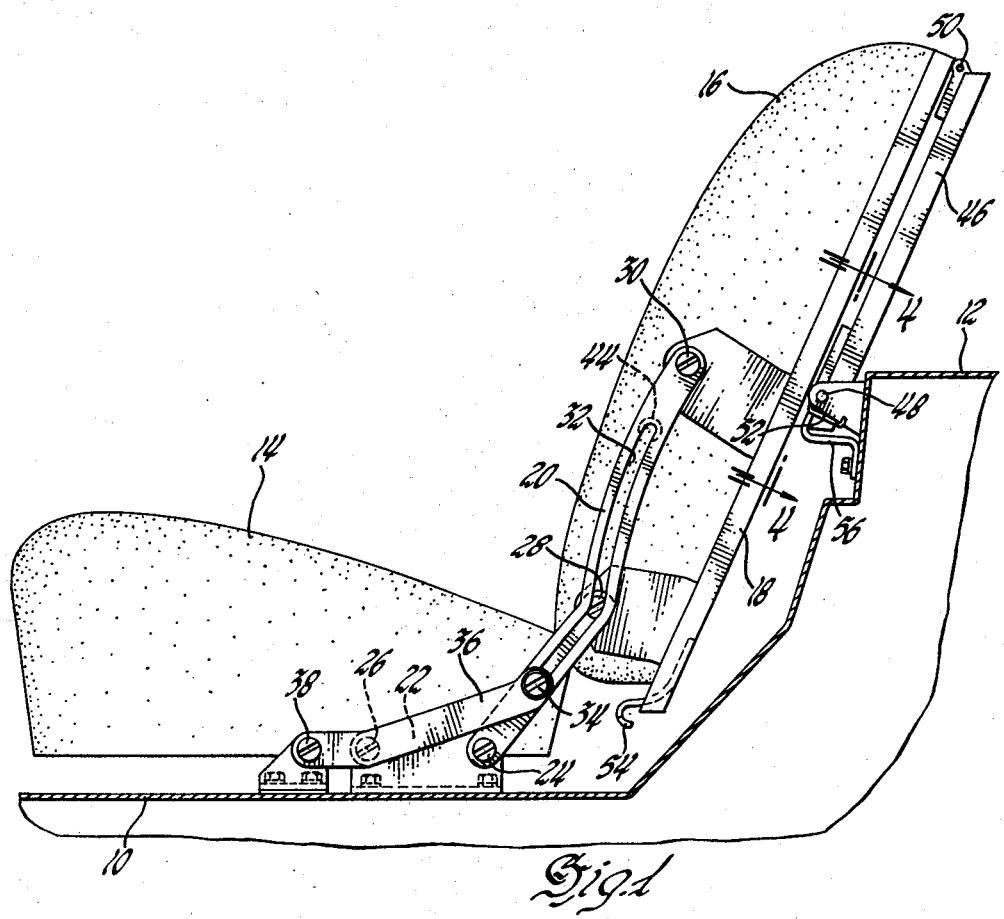
INVENTOR.
Rudolph A. Ferrara
BY
ATTORNEY

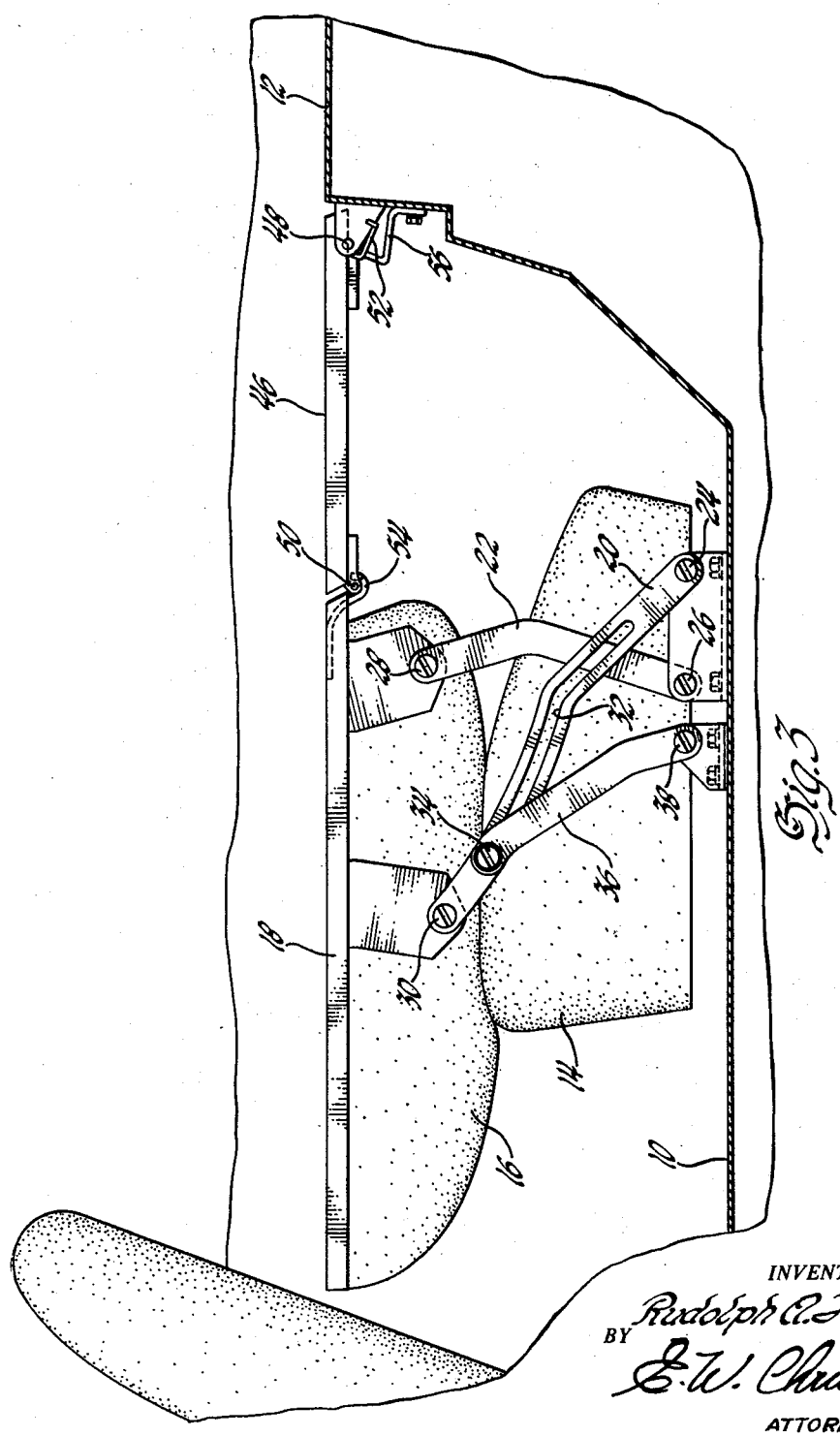

March 8, 1960 R. A. FERRARA 2,927,818
VEHICLE SEAT
Filed Sept. 22, 1958 3 Sheets-Sheet 3
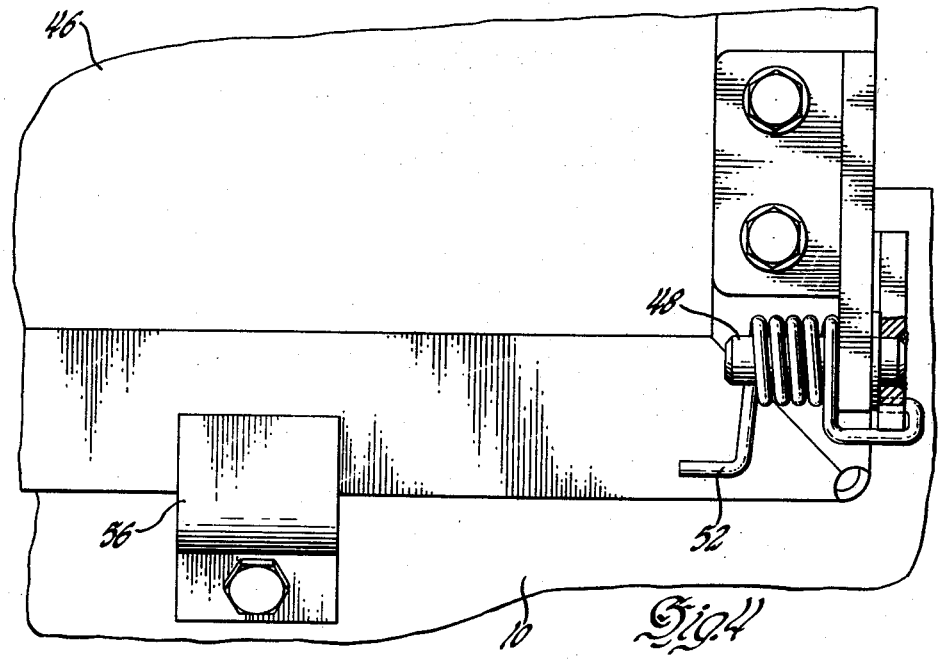
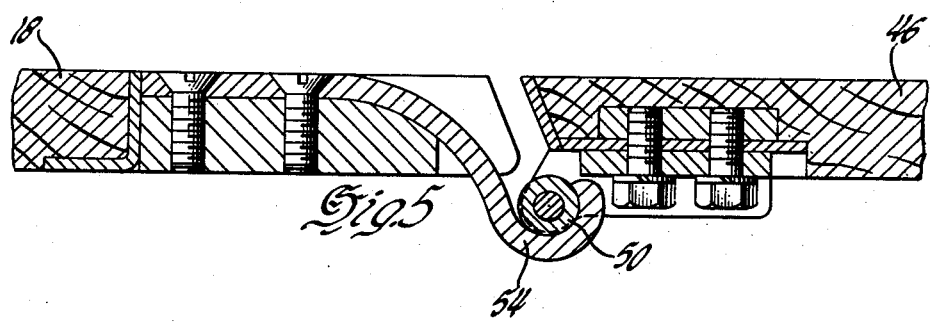
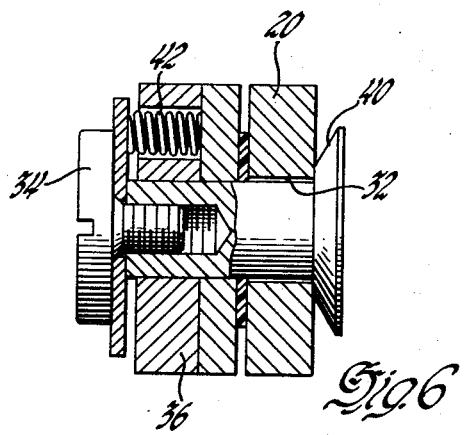
INVENTOR.
Rudolph A. Ferrara
BY
E. W. Christen
ATTORNEY

2,927,818

VEHICLE SEAT

Rudolph A. Ferrara, St. Clair Shores, Mich., assignor to General Motors Corporation, Detroit, Mich., a corporation of Delaware Application September 22, 1958, Serial No. 762,366

2 Claims. (Cl. 296—66)

This invention relates to vehicles and more particularly to seats which are folded to provide a cargo carrying floor portion.

Station wagons are provided with rear seats wherein the seat back is swung forward and downward from an upright position to a horizontal position so that a cargo carrying floor portion is presented above the primary floor by the rear face of the seat back. The seat back floor portion is then level with the elevated rear floor of the station wagon but spaced forwardly thereof. In the usual station wagon an auxiliary floor board is then manually placed in that space so that a continuous cargo floor is had.

An object of the invention is to provide the vehicle with an auxiliary floor panel which will automatically swing down with the seat back to the horizontal position and close the space between the seat back floor portion and the rear floor. A further object of the invention is to provide the vehicle with automatic means to swing the floor panel up with the seat back to the upright position.

In the drawings:

Figure 1 is a longitudinal section through a station wagon body showing the rear seat back and auxiliary floor panel in upright position;

Figure 2 is a partial plan view showing the hinging for the left side of the seat back;

Figure 3 is a view similar to Figure 1 showing the seat back and floor panel in horizontal position;

Figure 4 is a partial section taken on the plane indicated by the line 4—4 of Figure 1;

Figure 5 is a partial section through the seat back and floor panel in horizontal position; and Figure 6 is a partial section taken on the plane indicated by the line 6—6 of Figure 2.

Referring to the drawings, the station wagon body has a floor 10 which includes an elevated cargo carrying portion 12 over the rear axle. The rear seat has a seat bottom 14 mounted on the floor 10 and a seat back 16 hinge-supported at its lower portion so as to be swingable in a forward and downward direction from the upright position of Figure 1 where a passenger seat is presented to the horizontal position of Figure 3 where a cargo floor portion is presented above the floor 10 by the rear face 18 of the seat back. Only the elements at the left side of the seat are shown but similar elements are provided for the right side.

The seat back hinging consists of a pair of links 20 and 22 which are pivoted to the floor at 24 and 26 and to the seat back at 28 and 30. The link 20 has a slot 32 which slidably receives a pivot 34 that is carried by a link 36 which is pivoted to the floor at 38. The pivot 34 has a conical head 40 which is urged against the face of the link 20 by a compression spring 42. A conical cavity 44 is located at the upper end of the slot 32 to receive hte conical head 40 of the pivot 34 and lock the seat back in horizontal position. The pivot head 40 is automatically cammed out of the cavity 44 when the front edge of the seat back is lifted to return the seat back to upright position. The link 36 also anchors the seat back in upright position when the pivot 34 reaches the lower end of the slot 32.

On viewing Figures 1 and 3, it is seen that the seat back floor portion 18 moves forward with respect to the rear floor 12 as the seat back is swung from upright to horizontal position. A floor panel 46 is located immediately behind the seat back 16 and is hinged at its lower edge to the body by a pivot 48 so as to be swingable in a forward and downward direction from the upright position of Figure 1 to the horizontal position of Figure 2 and in the latter position the rear face of the floor panel serves as a cargo carrying continuation for the rear face of the seat back.

The floor panel 46 has a roller 50 secured to its front upper edge and a coil spring 52 encircles the pivot 48 and abuts against the body at one end and the floor panel at the other end. The floor panel and rollers are thus urged against the rear face of the seat back 18 regardless of seat back position. A cam track socket 54 is secured to the rear lower edge of the seat back. The roller 50 will run down the rear face of the seat back and into the cam track socket 54 under the action of the spring 52 when the seat back is manually swung down to the horizontal position to automatically swing down the floor panel to the horizontal position and will run out of the cam track socket and up the rear face of the seat back against the action of the spring when the seat back is manually swung up to the upright position to automatically swing up the floor panel to the upright position. The cam track socket 54 also serves as a forward support for the floor panel 56 in the horizontal position. A body bracket 56 engages the front lower edge of the floor panel 46 to serve as a positional stop for the upright position.

While the embodiment of the invention here described is preferred, it is understood that modifications may be made by the exercise of skill in the art which will lie within the scope of the inveniton.

I claim:

1. In a vehicle body of the type having a seat bottom and a seat back that is hinge-supported at its lower portion by the body so as to be swingable in a forward and downward direction from an upright position where a passenger carrying seat is presented to a horizontal position where a cargo carrying floor portion is presented above the primary floor of the body by the rear face of the seat back, the improvement comprising a panel located immediately behind the seat back and hinge-supported at its lower portion by the body so as to be swingable in a forward and downward direction from an upright position corresponding to the upright position of the seat back to a horizontal position where a second cargo carrying floor portion is presented above the primary floor of the body by the rear face of the panel to serve as a rearward continuation for the cargo carrying floor portion of the seat back, a roller secured to the front upper edge of the panel and engaging the rear face of the seat back, a spring engaging the panel and urging the roller against the rear face of the seat back, and a cam track socket secured to the rear lower edge of the seat back whereby the roller will run down the rear face of the seat back and into the cam track socket to automatically swing down the panel to the horizontal position as the seat back is swung down to the horizontal position and will run out of the cam track socket and up the rear face of the seat back to automatically swing up the panel to the upright position as the seat back is swung up to the upright position.

2. In a vehicle body of the type having a seat bottom and a seat back that is hinge-supported at its lower portion by the body so as to be swingable in a forward and downward direction from an upright position where a passenger carrying seat is presented to a horizontal position where a cargo carrying floor portion is presented above the primary floor of the body by the rear face of the seat back, the improvement comprising a panel located immediately behind the seat back and hinge-supported at its lower portion by the body so as to be swingable in a forward and downward direction from an upright position corresponding to the upright position of the seat back to a horizontal position where a second cargo carrying floor portion is presented above the primary floor of the body by the rear face of the panel to serve as a rearward continuation for the cargo carrying floor portion of the seat back, antifriction means carried by the front upper edge of the panel and engaging the rear face of the seat back, a spring engaging the panel and urging the antifriction means against the rear face of the seat back, and cam track means secured to the rear lower edge of the seat back whereby the antifriction means will ride down the rear face of the seat back and into the cam track means to automatically swing down the panel to the horizontal position as the seat back is swung down to the horizontal position and will ride out of the cam track means and up the rear face of the seat back to automatically swing up the panel to the upright position as the seat back is swung up to the upright position.

References Cited in the file of this patent

FOREIGN PATENTS

| | | |
|---|---|---|
| 106,977 | Australia | Mar. 17, 1939 |
| 694,578 | Germany | Aug. 3, 1940 |
| 928,506 | Germany | June 2, 1955 |